United States Patent
Bertinelli et al.

(10) Patent No.: US 8,014,336 B2
(45) Date of Patent: Sep. 6, 2011

(54) DELAY CONSTRAINED USE OF AUTOMATIC REPEAT REQUEST FOR MULTI-HOP COMMUNICATION SYSTEMS

(75) Inventors: Massimo Bertinelli, Frederiksberg (DK); Klaus Doppler, Espoo (FI)

(73) Assignee: Nokia Corporation, Espoo (FI)

( * ) Notice: Subject to any disclaimer, the term of this patent is extended or adjusted under 35 U.S.C. 154(b) by 1169 days.

(21) Appl. No.: 11/640,331

(22) Filed: Dec. 18, 2006

(65) Prior Publication Data
US 2008/0144626 A1    Jun. 19, 2008

(51) Int. Cl.
*H04W 4/00* (2009.01)
(52) U.S. Cl. ........ 370/315; 370/392; 370/310; 370/342; 370/329
(58) Field of Classification Search .......... 370/392, 370/310, 342, 315, 329; 714/748
See application file for complete search history.

(56) References Cited

U.S. PATENT DOCUMENTS

| | | | |
|---|---|---|---|
| 4,882,765 A | 11/1989 | Maxwell et al. | |
| 5,479,408 A * | 12/1995 | Will | 370/313 |
| 6,169,909 B1 * | 1/2001 | Koshino | 455/557 |
| 6,662,330 B1 | 12/2003 | Hershey | 714/748 |
| 7,000,021 B1 * | 2/2006 | Radhakrishnan et al. | 709/230 |
| 2002/0004924 A1 * | 1/2002 | Kim et al. | 714/752 |
| 2002/0032788 A1 | 3/2002 | Emanuel et al. | |
| 2002/0053062 A1 * | 5/2002 | Szymanski | 714/801 |
| 2002/0075842 A1 * | 6/2002 | Ghosh et al. | 370/347 |
| 2003/0103459 A1 * | 6/2003 | Connors et al. | 370/235 |
| 2005/0141593 A1 * | 6/2005 | Pasanen et al. | 375/130 |
| 2005/0265246 A1 * | 12/2005 | Farley et al. | 370/241 |
| 2006/0052099 A1 * | 3/2006 | Parker | 455/426.1 |
| 2006/0133342 A1 | 6/2006 | Zeng | |
| 2006/0209837 A1 * | 9/2006 | Lee et al. | 370/394 |
| 2007/0081483 A1 * | 4/2007 | Jang et al. | 370/315 |
| 2007/0147322 A1 * | 6/2007 | Agrawal et al. | 370/338 |
| 2007/0254586 A1 * | 11/2007 | Lee et al. | 455/11.1 |
| 2008/0107091 A1 * | 5/2008 | Ramachandran | 370/338 |
| 2008/0112365 A1 * | 5/2008 | Kwun et al. | 370/332 |
| 2008/0117877 A1 * | 5/2008 | Min et al. | 370/331 |
| 2008/0123579 A1 * | 5/2008 | Kozat et al. | 370/312 |
| 2008/0274692 A1 * | 11/2008 | Larsson | 455/24 |
| 2008/0285500 A1 * | 11/2008 | Zhang et al. | 370/315 |
| 2008/0310338 A1 * | 12/2008 | Charpenter et al. | 370/315 |
| 2008/0310409 A1 * | 12/2008 | Larsson et al. | 370/389 |
| 2010/0281322 A1 * | 11/2010 | Park et al. | 714/748 |

FOREIGN PATENT DOCUMENTS
EP    0 851 632 A2    7/1998
(Continued)

OTHER PUBLICATIONS
International Search Report PCT/EP 03/06333 dated Sep. 12, 2003.
(Continued)

*Primary Examiner* — Pierre-Louis Desir
(74) *Attorney, Agent, or Firm* — Squire, Sanders & Dempsey (US) LLP (57) ABSTRACT

Minimization of delay due to automatic repeat requests in a multi-hop communication system can be accomplished to optimize the performance of delay-constrained applications such as voice over internet protocol (VoIP). The protocol described with relation to such embodiments can reduce the possible retransmissions to the first hop (the hop connecting a mobile node to a relay node). Thus, certain embodiments of the present invention can protect the most error-prone link while reducing the overall delay experienced by the user.

27 Claims, 8 Drawing Sheets

FOREIGN PATENT DOCUMENTS

| | | |
|---|---|---|
| WO | WO 97/24829 | 7/1997 |
| WO | WO 00/74306 A2 | 12/2000 |
| WO | WO 01/15374 A1 | 3/2001 |
| WO | WO 01/78441 A1 | 10/2001 |
| WO | WO 02/01758 A1 | 1/2002 |
| WO | WO 2004/002082 A1 | 12/2003 |
| WO | WO 2004/008698 A2 | 1/2004 |

OTHER PUBLICATIONS

International Search Report PCT/CA 03/01043 dated Feb. 18, 2004.
International Search Report PCT/IB2007/003962 dated Jun. 10, 2008.
Dube R. et al.; "Signal Stability-Based Adaptive Routing (SSA) for Ad Hoc Mobile Networks"; Feb. 1, 1997; pp. 36-45.

* cited by examiner

DELAY CONSTRAINED USE OF AUTOMATIC REPEAT REQUEST FOR MULTI-HOP COMMUNICATION SYSTEMS

BACKGROUND OF THE INVENTION

1. Field of the Invention

The present invention relates to wireless communications and radio network technology. More specifically, the present invention relates to retransmission protocol in relay/mesh networks.

2. Description of the Related Art

A wireless relay network can be a multi-hop system in which end nodes, such as mobile stations (MS), subscription stations (SS), and mobile nodes (MN) are connected to the base station (BS), access point (AP), or access gateway (AG) via one or more relay station (RS) or relay node (RN). Communication traffic between the MS/SS and the BS/AP passes through and can be processed by the relay station (RS) or relay node (RN).

The 802.16 Mobile Multi-Hop Relay (MMR), a study item established in the Institute of Electrical and Electronics Engineers (IEEE) 802.16 working group, provides examples of relay networking. The MMR working group focuses on defining a network system that utilizes relays stations (RS) to extend the network coverage and/or enhance the system throughput. An exemplary relay network can include, in part, a relay station (RS), mobile station (MS), subscriber station (SS), and base station (BS).

Hybrid automatic repeat request (H-ARQ) is a scheme that combines ARQ protocols with forward-error-correcting (FEC) schemes that are generally considered to be good error-control techniques for wireless links. Different wireless technology may have different H-ARQ schemes.

In IEEE 802.16, the H-ARQ scheme is implemented as a part of the media access control (MAC) layer and can be enabled on a per-terminal basis. Two main variants of H-ARQ are supported: chase combining and incremental redundancy (IR). For IR, the physical (PHY) layer encodes the H-ARQ and generates four versions for the encoded H-ARQ attempts. Each H-ARQ attempt is uniquely identified using a H-ARQ attempt identifier (SPID). For chase combining, the PHY layer encodes the H-ARQ packet and generates only one version of the encoded packet. As a result, no SPID is required for chase combining. Thus, three retransmissions (four total transmissions) can be a default number of retransmissions.

For downlink operation, the BS can send a version of the encoded H-ARQ packet to the MS/SS. The MS/SS can attempt to decode the encoded packet on this first H-ARQ attempt. If the decoding is successful, the MS/SS can send an acknowledgement (ACK) to the BS. If the decoding is not successful, the MS/SS can send a non-acknowledgement (NAK or NACK) to the BS. In response, the BS can send another H-ARQ attempt to the MS/SS. The BS may continue to send H-ARQ attempts until the MS/SS successfully decodes the packet and sends an ACK.

The H-ARQ scheme can work well in a system without a relay station (RS) and where the H-ARQ scheme is applied directly between the BS and MS/SS. However, when a RS is introduced into the system, although H-ARQ is still implemented between the MS/SS and BS, the RS can be required to forward all the H-ARQ attempts and ACK/NAKs between the MS/SS and BS. Even when H-ARQ is used only on a per hop basis (for example, between each successive node), the additional delay for each hop can accumulate when there are multiple hops.

SUMMARY OF THE INVENTION

An embodiment of the present invention can be a relay node. The relay node can include an access unit configured to communicate directly or indirectly with a user equipment. The relay node can also include a relay unit configured to communicate with a relay node or a mesh node. The relay node can further include a processor unit configured to allow an automatic repeat request protocol for the access unit and to disable the automatic repeat request protocol for the relay unit. The processor can be configured to disable or limit the automatic repeat request protocol for the relay unit selectively.

Another embodiment of the present invention can also be a relay node. This relay node can include access means for communicating directly or indirectly with a user equipment. This relay node can also include relay means for communicating with a relay node or a mesh node. This relay node can further include processor means for allowing an automatic repeat request protocol for the access unit and disabling or limiting the automatic repeat request protocol for the relay unit. The processor means can be configured to disable or limit the automatic repeat request protocol for the relay unit selectively.

A further embodiment of the present invention can be a method. The method can include providing a relay node in direct or indirect communication with a user equipment and a relay network or a mesh network, wherein the relay network or mesh network provides access to a internet protocol backbone. The method can also include configuring the relay node to use an automatic repeat request protocol for communication with the user equipment. The method can further include configuring the relay node not to use or to limit use of the automatic repeat request protocol for communicating with the relay network or the mesh network. The configuring of the relay node not to use or to limit use of the automatic repeat request protocol for communicating with the relay network or the mesh network can be performed selectively.

An additional embodiment of the present invention can be a system. The system can include a user equipment and a relay network or a mesh network configured to provide access to an internet protocol backbone. The system can also include a relay node configured to communicate with the user equipment, configured to communicate directly or indirectly with the relay network or mesh network, and configured to use an automatic repeat request protocol for communication with the user equipment and not to use or to limit use of the automatic repeat request protocol for communication with the relay network or mesh network. The relay node can be configured not to use or to limit use of the automatic repeat request protocol for communication with the relay network or mesh network on a selective basis.

Another embodiment of the present invention can be a computer program embodied on a computer readable medium, encoding instructions for performing a method. The method can include initiating a relay node in direct or indirect communication with a user equipment and a relay network or a mesh network, wherein the relay network or mesh network provides access to a internet protocol backbone. The method can also include configuring the relay node to use an automatic repeat request protocol for communication with the user equipment. The method can further include configuring the relay node not to use or to limit use of the automatic repeat request protocol for communicating with the relay network or the mesh network. The configuring the relay node not to use or to limit use of the automatic repeat request protocol for communicating with the relay network or the mesh network can be programmed to be performed selectively.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

In view of the above, certain embodiments of the present invention can provide an improved H-ARQ or other automatic repeat request scheme that can reduce delay for delay-sensitive traffic by avoiding or limiting retransmissions in certain cases. The invention can be applied to relay in various wireless technologies, such as Worldwide Interoperability for Microwave Access (WiMAX) MMR.

In other words, certain embodiments of the present invention address the additional delay due to retransmission protocol that can exist in a relay and/or mesh network. Such embodiments can reduce the delay for delay sensitive traffic by avoiding retransmissions in certain cases.

Thus, certain embodiments of the present invention provide a method to minimize the delay due to H-ARQ or other forms of automatic repeat request protocol in a multihop communication system. Such embodiments may optimize the performance of delay-constrained applications such as voice over internet protocol (VoIP). The protocol described with relation to such embodiments can reduce the possible retransmissions to the first hop (the hop connecting a mobile node to a relay node). Thus, certain embodiments of the present invention can protect the most error-prone link while reducing the overall delay experienced by the user.

The conventional H-ARQ protocol, broadly applied, can lead to delay in a conventional multi-hop systems. This delay may be of particular concern when delay-sensitive services (such as VoIP, video over IP, interactive collaboration, or interactive gaming) are offered. Thus, a solution is proposed: for delay-sensitive services such as, for example, VoIP, the retransmission protocol can be limited to the first link. The first link can be the link between the mobile node (MN) and the immediate relay node (RN). This solution can help to protect what is often expected to be the weakest link in a relay or mesh network.

The possibility that this link may be the weakest can be determined from the fact that, in many instances, one of the two ends of the link can be a mobile terminal, with all the relative constraints that go with a mobile terminal. All the other links can, in many instances, be limited to being between stationary nodes (fixed RNs). Those links could, consistent with certain embodiments of the present invention, be designed to deal with deteriorating channel conditions using different approaches than retransmissions; for example, by more robust link adaptation, or routing.

Certain embodiments of the present invention can be performed on a local basis, without need of intervention by the BS, and, thus, can be implemented without the complication of additional signaling.

Future communication systems may use multiple hops in order to extend coverage without exponentially increasing installation and maintenance costs of a network. In order to increase the system capacity and give the users high data rates, the use of high transmission frequencies may be needed, which may result in a significant reduction in coverage without a capillary distribution of base stations, in a cellular-like system. An alternative is to create a backhaul based on cheaper elements, Relay Nodes (RN), connecting each base station or access gateway (AG) to the mobile nodes (MN) through one or more hops.

Different configurations may be implemented, ranging from a tree-like infrastructure, in which the AG is the root and the RNs are hierarchically distributed (on different tiers) around it, to a mesh system, in which many connections are possible between the RNs, without a pre-defined organization. A reconfigurable tree-like structure can also be seen as a mesh system.

Figure 1:
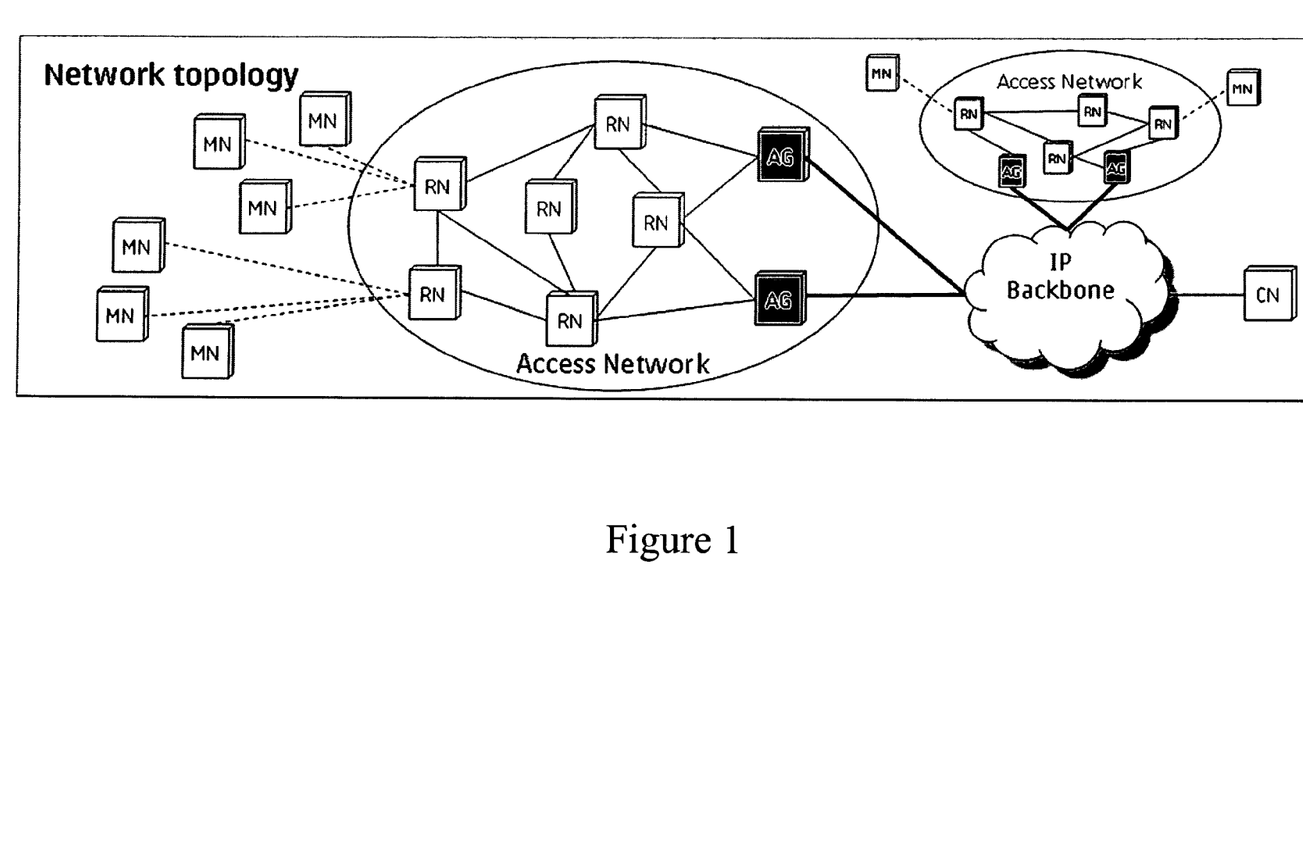
FIG. 1 illustrates a network topology of a network of an embodiment of the present invention, compatible with a next generation network.

FIG. 1 illustrates a network topology of such a network that may implement an embodiment of the present invention compatible with a next generation network. The MNs can be associated to any RN or AG in the access network. The radio interface between RN and MN can be termed the access radio, and the radio interface between AG and RN, and between RN and RN can be termed the mesh radio.

In order to ensure reliable communication over a wireless link, error control coding techniques may be needed, possibly coupled with retransmissions whenever the receiver is not able to recover the message correctly due to bad channel conditions. Many current cellular systems under investigation (such as, for example, Long Term Evolution (LTE)) and standardized (such as, for example, High Speed Packet Access (HSPA)) combine power error control coding with fast retransmission at the PHY/Link layer, resulting in a technique known as Hybrid ARQ (H-ARQ).

The retransmission of a packet can produce an increase in the air interface delay experienced by the user. The delay can depend on several parameters, ranging from the length of the packet, the number of H-ARQ processes used and the number of retransmissions. For example, in FIG. 2, the H-ARQ structure for High Speed Uplink Packet Access (HSUPA), uplink evolution of WCDMA, is shown, in the case (mandatory under the standard) of 10 ms packets and with two retransmissions. Some of the traffic to be carried over the wireless system (especially cellular-type) may be subject to stringent delay requirements.

A typical example of traffic that may be subject to a stringent delay requirement is Voice over IP (VoIP). In VoIP, the common understanding is that the end to end delay should be lower than 80 ms in order for the communication to be acceptably fast. Other examples of traffic that may subject to a stringent delay requirement are interactive collaboration and interactive gaming.

Figure 2:
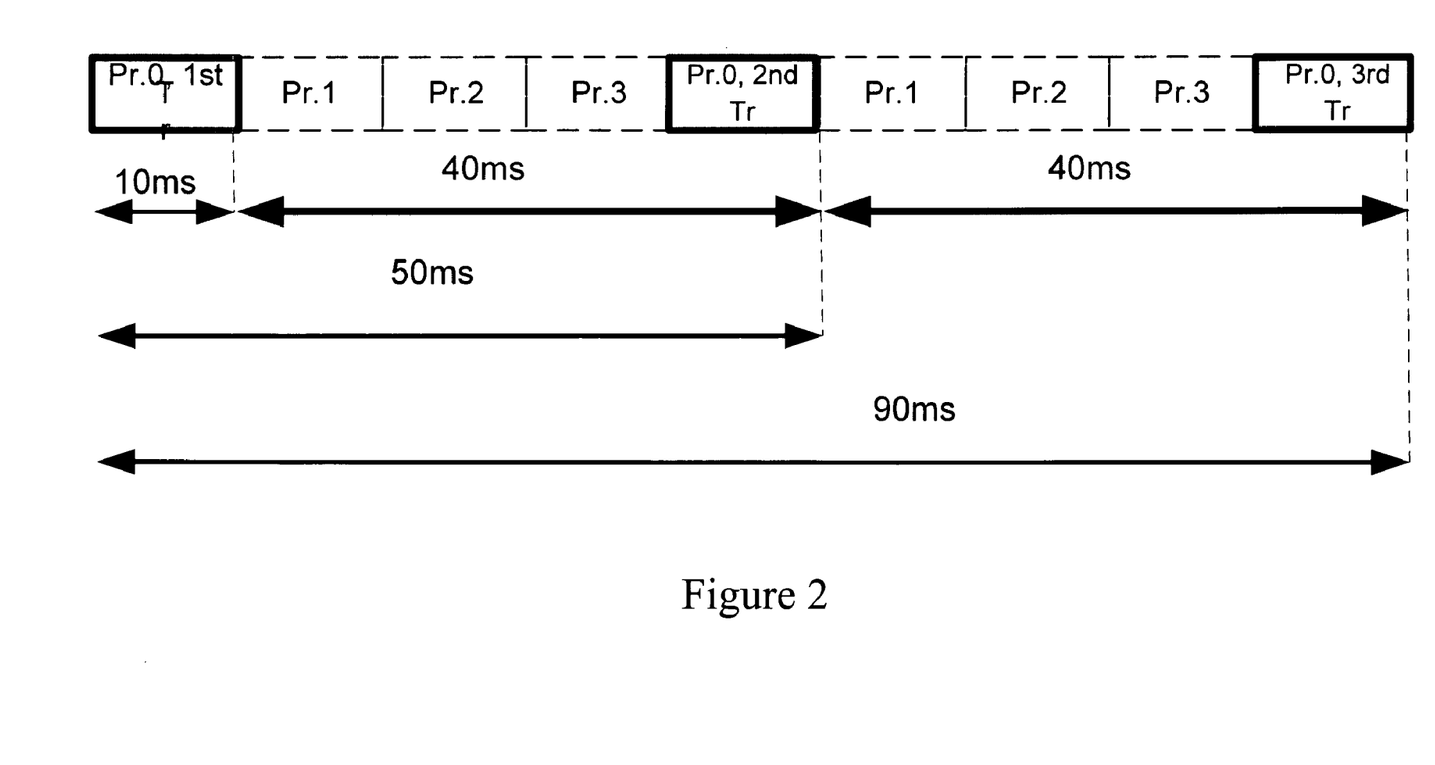
FIG. 2 illustrates how two retransmissions over a single link can violate a stringent delay requirement.

From FIG. 2, it is clear that in HSPA, two retransmissions over a single link are enough to violate the stringent delay requirement and prevent successful VoIP transmissions. In order to address this issue, a proper choice of parameters (number of possible retransmissions and packet length among the others) may be needed. The air interface delay can be much reduced with more advanced systems, such as LTE.

If multi-hop communication is considered and retransmission techniques (such as H-ARQ) are used on each link (i.e. each hop) to provide reliability, the end to end delay can increase with the number of hops, resulting in an unacceptable degradation of the quality perceived by the final user of VoIP services. Considering again the HSUPA example of FIG. 2, even choosing the parameter properly in order to have a maximum air interface delay below 80 ms in a single link, it becomes evident how adding a second link (i.e. having a RN between the MN and the AG) can double the end to end delay.

With more advanced systems, where the delay over a single link is expected to be much lower, the presence of multiple hops between MN and AG could potentially prevent systems from complying with strict delay requirements. Besides, whenever multiple routes are possible between MN and AG (as in the case of a mesh), it is difficult to know a priori the number of hops a packet will experience. Therefore, H-ARQ over each single link in the multi-link path could make the final maximum delay both unpredictable and unacceptably long.

Accordingly, considering a system in which MNs (or other kinds of user equipment) connect to the AG (or similar access point or base station) through multiple hops over intermediate RNs, the first link in the chain, i.e. MN->RN, can be singled out for special treatment. While MNs experience difficult propagation conditions due to their mobility, many systems under study (for example, 802.16) employ fixed RNs to expand the system coverage.

Besides, the connection between RNs (RN->RN) and AG (RN->AG) could take advantage of line of sight (LOS) propagation, with proper system planning. Even if the connection is not LOS, the channel response will be stationary, which should ease link adaptation.

In certain embodiments of the present invention, thus, H-ARQ is limited to the first link only (MN->RN) whenever delay sensitive services such as VoIP over multiple hops are considered. This way, the reliability over the most sensitive link can be enhanced. The data packets, once successfully received by the first RN in the chain, can then be forwarded toward the AG over more reliable links.

The system considered can be represented by two radio systems: one connecting the MN to the first RN (the access radio system), and the other carrying the signal towards the base station/AG (the mesh network system). The case in which a single radio technology is used for both systems can be seen as a subset of the general case. Different traffic streams transmitted over the system can be differentiated by means of a quality of service (QoS) parameter.

In particular, in a simple implementation, a bit in the MAC header of each packet could distinguish a delay sensitive packet (e.g. VoIP) from other packets with less stringent requirements. The RNs in the backhaul system can read this bit and, based on its value, they can disable the per-link H-ARQ (by, for example, setting the maximum number of retransmissions to 0) and switch to a more robust link adaptation.

For example, the RNs can be configured so that delay insensitive traffic may operate at a packet error rate of 20% and the delay sensitive traffic can operate at a packet error rate of 1%. Furthermore, routing can be used to add reliability: if the quality of one of the links is temporarily lower than required, the traffic could be re-routed, without the delay increase that would otherwise result from additional retransmissions.

Depending on the mesh network implementation, the RN or AG can be aware of the backhaul system topology. Thus, the RN or AG can know how many hops the packet will have to pass in the mesh. In one example, for two hops it uses H-ARQ when forwarding in the backhaul system, but for three or more hops H-ARQ is switched off and the mesh network uses more robust link adaptation. Instead of being configured to switch off automatic repeat request for multiple hops, the RN or AG can be reconfigured to limit automatic repeat request by, for example, using one retransmission instead of four retransmissions.

In another mesh network implementation, each delay sensitive packet can get a timestamp when it arrives at the AG (in the down link (DL) path) or at the first RN (in the up link (UL) path). Thus, the RNs can know, when forwarding the packet, how much time the packet has already spent in the mesh network. Depending on that information, and on the number of hops still to come, the RN can decide whether to deactivate H-ARQ and use a more robust link adaptation. It should be noted that H-ARQ is one example of an automatic repeat request protocol. The present invention, however, is not limited to the H-ARQ example, but can be applied broadly.

A more advanced implementation could be made, in which more QoS classes are used, with increasing delay requirements. Then, more flexibility could be given to the RNs in the backhaul system. Following the same procedure described above, the RNs could decide to disable the per-link H-ARQ and use a more robust link adaptation independently for each QoS class. In any case, H-ARQ is active on the first link (access radio), which can be the weakest one in the transmission chain.

In addition to delay sensitive traffic like VoIP, traffic that is sensitive to delay jitters (for example, streaming traffic) is an important QoS class. The same mechanisms can be applied to this QoS class to reduce the delay jitter of such traffic streams.

In addition to these mechanisms, traffic scheduling at the different nodes of the mesh network can play an important role. Any known scheduling scheme that take into account different QoS classes, for example, utility based scheduling schemes, delay differentiated scheduling schemes, and the like can be used in conjunction with certain embodiments of the present invention.

Figure 3:
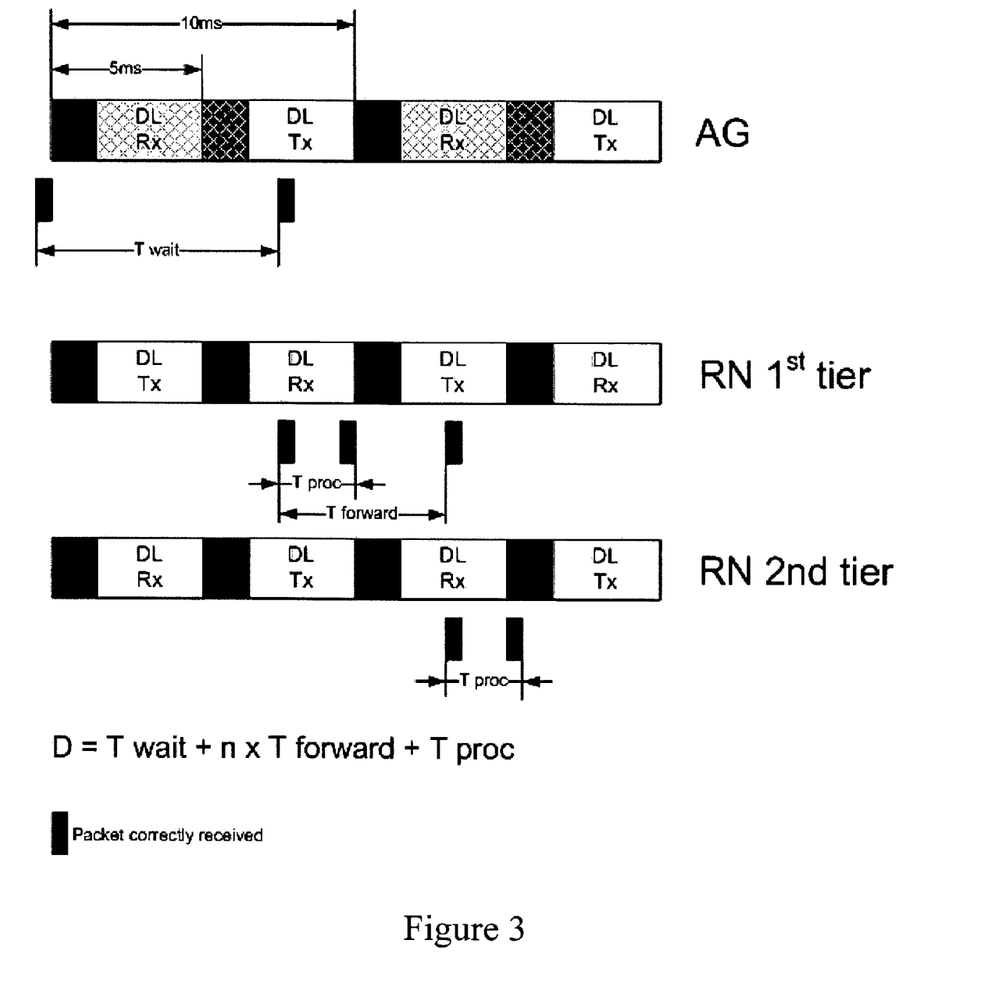
FIG. 3 illustrates delay in packet processing in the down link (DL) direction without retransmission.

FIG. 3 illustrates the packet forwarding in DL without retransmissions following the four phase mesh network operation with 3GPP LTE radio parameters, in particular, 10 ms frame length. In this example, the system is operating in time division duplex (TDD) operation mode and a single frame is divided into four phases (two UL and two DL). The packet can arrive at the AG and the next DL Tx phase can be the first possibility to forward the packet. Thus, the waiting time until the first transmission opportunity can be up to T wait=8.5 ms (UL Rx+DL Rx+UL Tx+2 sub-frames and 10/10 split). The additional two sub-frames delay can stem from the fact that the packet should be processed by the AG and that the allocation table should be signaled to the first tier RNs in the beginning of the sub-frame.

The first tier RN receives the packet and processes the packet. If it was received correctly, it can forward it in the next DL Tx phase and the additional delay is T forward=5 ms. Only at the last hop, the processing delay adds to the overall delay. A processing delay T proc=1 ms can be assumed. The overall delay without retransmissions will be D=T wait+(n hops−1)×T forward+T proc=14.5 ms (2 hops), 19.5 ms (3 hops) and 24.5 ms (4 hops). It can be seen that the mesh network operation itself is very efficient and with low delay.

Figure 4:
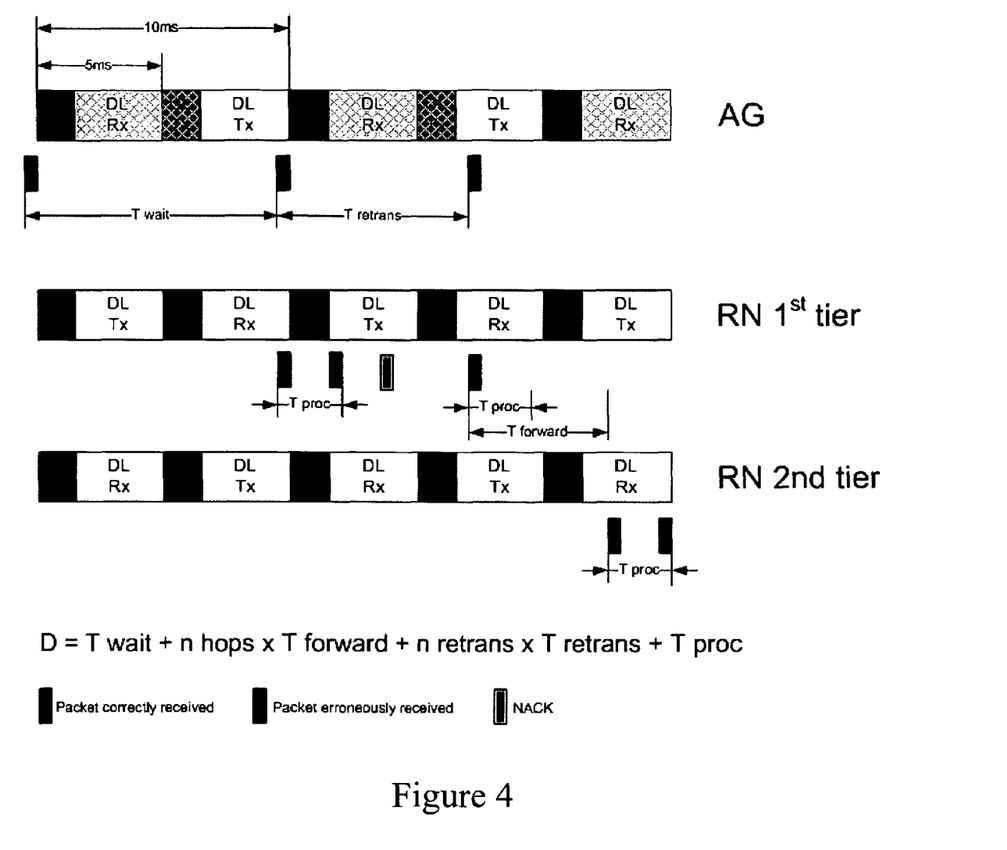
FIG. 4 illustrates delay in packet processing in the down link (DL) direction with retransmissions.

The previous delay analysis was, however, without taking retransmissions into account. FIG. 4 illustrates the same forwarding procedure with retransmissions. In this case, the first tier RN can receive the packet erroneously and can send a NACK to the AG. The AG can wait until the next DL transmission phase to retransmit the packet. As the next DL Tx phase may only be in the next frame, the delay T retrans=10 ms. Thus, a retransmission can take twice as much time as the normal packet forwarding. Even worse, in the absence of fast acknowledgements (as discussed, for example, in U.S. Patent Application No. 60/864,704) the processing delays might be too long to send the NACK during the following UL Tx phase.

Even if the processing delay would be short enough, there might be no resources allocated to that RN. Missing the opportunity to send the NACK could cause additional 10 ms delay.

In other words, every retransmission can add at least another 10 ms delay to the packet. If the delay of one retransmission is incorporated in the mesh network design, the number of hops will, therefore, be very limited. The common understanding for VoIP traffic is that the end to end delay should be lower than 80 ms.

If the access radio (RN-UT) has a delay of 20 ms, then the delay in the mesh network should be below 60 ms. To meet that target while allowing one retransmission per hop restricts the mesh network to three hops: D=T wait+(n hops−1)×T forward+n hops×T retrans=8.5 ms+10 ms+30 ms=53.5 ms. Note that the signal has to be forwarded only twice (n hops=3) but three retransmissions have to be considered.

In addition to retransmissions, the network load can contribute to the delay in the mesh network. With increasing network load the AG and the RNs might not be able to forward delay sensitive data in the first available transmission phase. Waiting for the next transmission opportunity could cause additional 10 ms delay. A mesh network is unlikely to be designed for very low loads. Therefore, the delay of waiting for the next transmission opportunity in the mesh network design can also be considered.

As the load in the mesh network will be highest close to the AG, the delay can be, for only the first two hops, T add=20 ms. Thus, by including this delay and retransmissions, the mesh network would only support two hops D=T wait+(n hops−1)×T forward+n hops×T retrans+T add=8.5+5+20+20=53.5 ms. If retransmissions for packets that have to be forwarded over 3 or more hops can be avoided, then the mesh network can support up to five hops D=8.5+25+20=53.5 ms. Five hops should be sufficient to build coverage in a metropolitan environment using a mesh network.

Thus, certain embodiments of the present invention can provide geometrically better coverage in loaded mesh networks for delay sensitive communications such as streaming and VoIP. Indeed, some embodiments of the present invention can reduce the delay introduced by retransmissions by limiting the amount of retransmissions for packets that have to be forwarded over several hops in the mesh network and by using more robust link adaptation for delay sensitive traffic instead.

Using certain embodiments of the present invention, the mesh network can carry VoIP traffic over five hops (if retransmissions are limited to the first hop) compared to three hops (if retransmissions are used on every hop).

Thus, the problem of delay for services such as VoIP over multi-hop communication system can be addressed by reducing the additional delays due to retransmissions over each link and constraining the retransmission over the first (and weakest) link in the chain.

In order to ensure reliable transmission over the backhaul system, possible re-routing of packets could be applied to strengthen the reliability of the system and to further accommodate the delay requirements.

Figure 5:
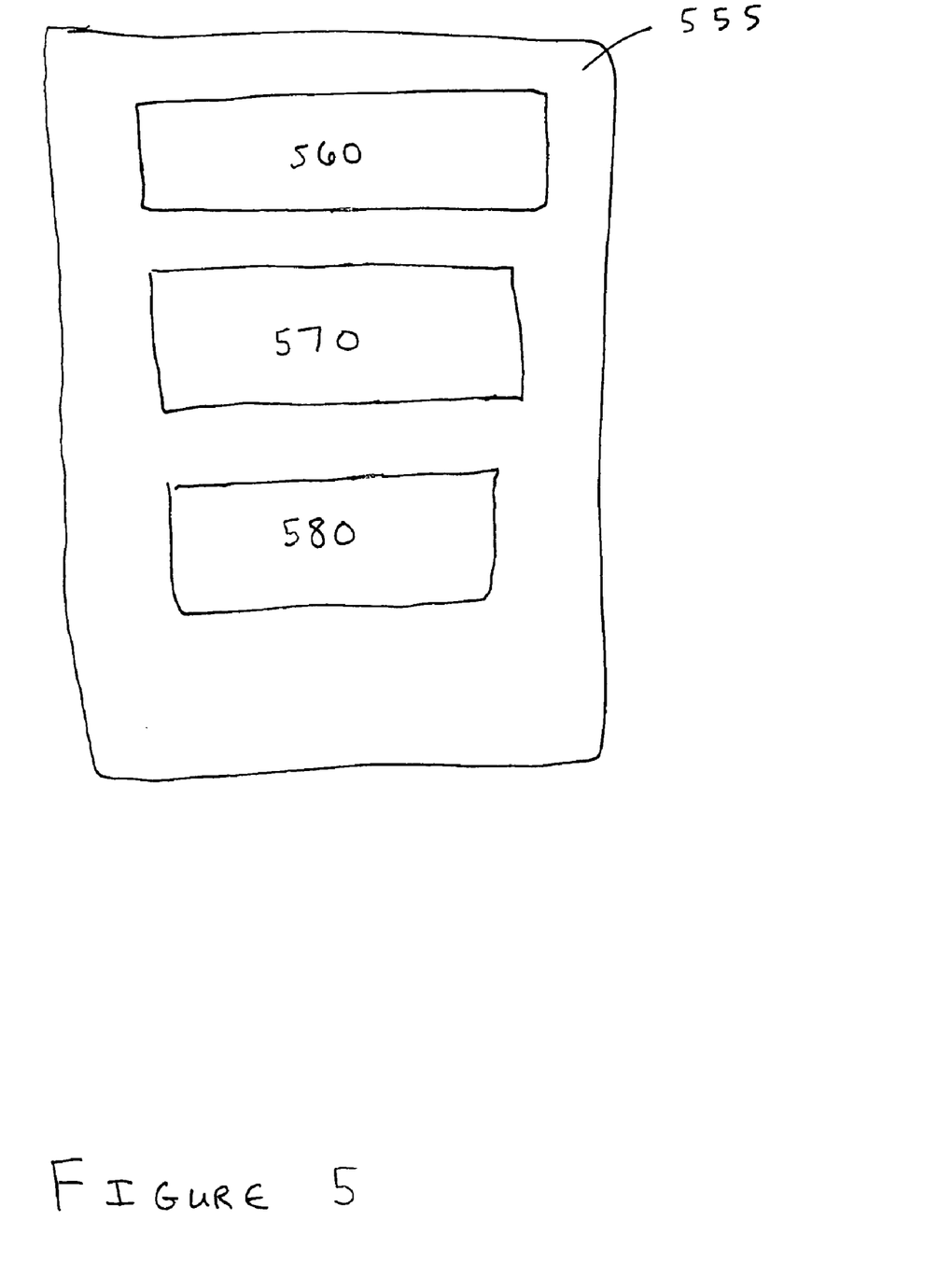
FIG. 5 illustrates an embodiment of the present invention that is a computer program embodied on a computer readable medium.

FIG. 5 illustrates an embodiment of the present invention that is a computer program embodied on a computer readable medium 555, encoding instructions for performing a method. The instructions for performing the method include instructions for initiating 560 a relay node in communication with a user equipment and a relay network or a mesh network, wherein the relay network or mesh network provides access to a internet protocol backbone. The relay node may be in direct or indirect communication with the user equipment. Thus, the relay node may provide the last hop to the user equipment (direct communication) or a penultimate or other intermediate hop to the user equipment (indirect communication). The instructions for performing the method include instructions for configuring 570 the relay node to use an automatic repeat request protocol for communication with the user equipment. The instructions for performing the method include instructions for configuring 580 the relay node not to use the automatic repeat request protocol for communicating with the relay network or the mesh network.

Figure 6:
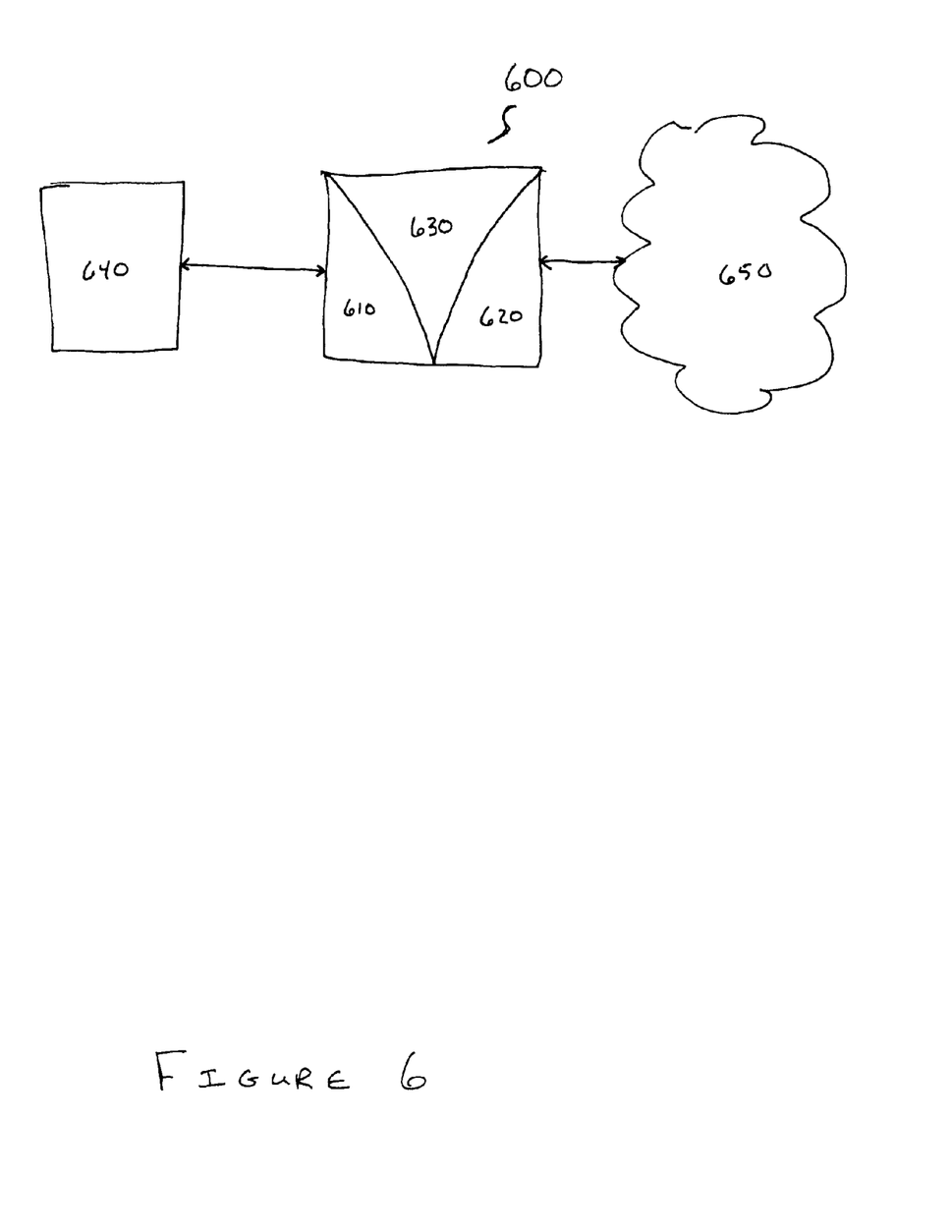
FIG. 6 illustrates a relay node in accordance with one embodiment of the present invention.

FIG. 6 illustrates a relay node 600 in accordance with one embodiment of the present invention. The relay node 600 can include an access unit 610 configured to communicate with a user equipment 640. The access unit 610 may be implemented using hardware, software, or a hybrid of hardware and software. The access unit 610 can, for example, include an antenna for communicating with the user equipment 640, as well as appropriate transceiver components to enable wireless communication with the user equipment 640.

The relay node 600 may also include a relay unit 620 configured to communicate with a relay node or a mesh node in a network 650. The relay unit 620 may be implemented using hardware, software, or a hybrid of hardware and software. The relay unit 620 can, for example, include an antenna for communicating with the network 650, as well as appropriate transceiver components to enable wireless communication with the network 650.

The relay node 600 can also include a processor unit 630 configured to allow an automatic repeat request protocol for the access unit 610 and to disable the automatic repeat request protocol for the relay unit 630. Alternatively, instead of disabling the automatic repeat request protocol the relay node 600 could change the ARQ parameters to, for example, one retransmission instead of four retransmissions, in which four transmission can be the default number of retransmissions.

The access unit 610 can be configured to communicate with the user equipment 640 over a radio link. The user equipment 640 can be a mobile user equipment, such as a cellular phone, a mobile phone, a mobile node, a mobile station, a personal digital assistant, a network enabled music player, a network enabled still or video camera, or other portable electronic device that is configured to receive service from or provide service to a network.

The relay unit 620 can be configured to communicate with a relay node or mesh node that is another relay node (similar to the relay node 600), a base station, an access point, or an access gateway.

The processor 630 can be configured to disable the automatic repeat request protocol for the relay unit selectively. In order to selectively disable the automatic repeat request protocol, the processor 630 can be configured to identify a quality of service for communication of the user equipment 640. The quality of service can be identified as being, for example, voice over internet protocol traffic or streaming traffic.

The processor 630 can be configured to disable the automatic repeat request protocol for the relay unit 620 when communication with the user equipment 640 meets a predetermined condition. The predetermined condition can be that a user equipment 640 desired delay is less than a predetermined threshold. The predetermined threshold can be about 80 ms. The predetermined threshold can depend on the number of hops the packet has to travel and the position (with respect, for example, to hops away from AG in DL) of the RN. Thus, 80 ms can merely be the end-to-end delay that should be achieved to satisfy typical user requirements.

Alternatively, or in addition, the predetermined condition can be that a number of expected hops between an access gateway, access point, or base station and the user equipment is greater than or equal to a predetermined number of hops. The predetermined number of hops can be an integer less than or equal to five.

As yet a further alternative or additional feature, the predetermined condition can be that a timestamp on a packet indicates an existing delay that is equal to or greater than a predetermined threshold, for example, 60 ms/number of hops+(total number of hops−number of hops away from AG)*60 ms/(number of hops)*0.1. This example threshold can provide a delay threshold that depends on the number of hops and enables more delay for hops close to the AG where traffic density can be higher.

The processor 630 can be configured, when the processor 630 disables the automatic repeat request protocol for the relay unit 620, to employ intelligent routing to avoid weak links in the relay network or mesh network (i.e. network 650). Alternatively, or in addition, in such a circumstance the processor 630 can be configured to change traffic scheduling parameters. As a further alternative or addition, the processor 630 can, in such a situation, be configured to use a more robust link adaptation for the links on the relay side.

Figure 7:
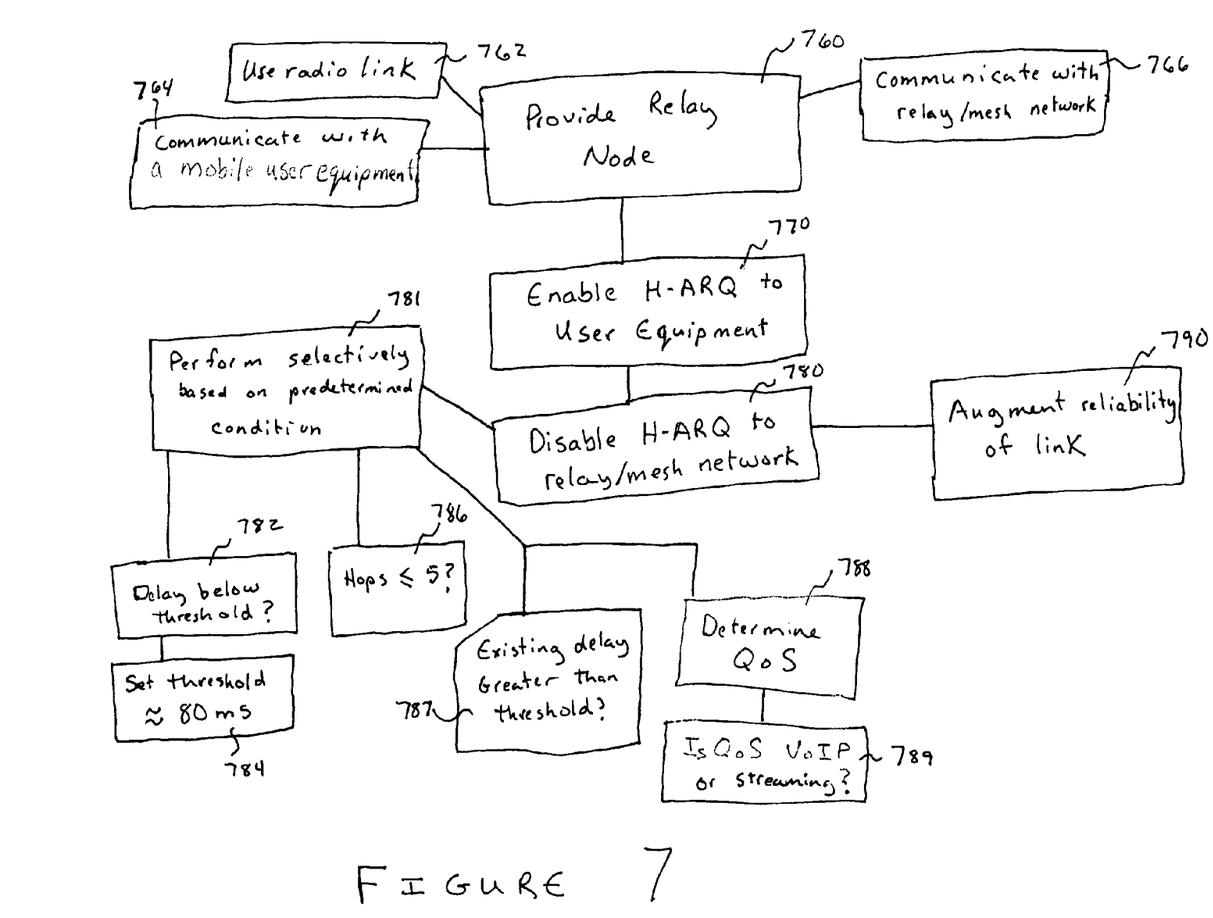
FIG. 7 illustrates a method according to one embodiment of the present invention.

FIG. 7 illustrates a method according to one embodiment of the present invention. The method can include providing 760 a relay node in direct or indirect communication with a user equipment and a relay network or a mesh network. The relay network or mesh network can provide access to a internet protocol backbone. The method can also include configuring 770 the relay node to use an automatic repeat request protocol for communication with the user equipment. The method can further include configuring 780 the relay node not to use the automatic repeat request protocol for communicating with the relay network or the mesh network.

The method can also include configuring 762 the relay node to communicate with the user equipment over a radio link. The method can further include configuring 764 the relay node to communicate with a mobile user equipment. The method can additionally include configuring 766 the relay node to communicate with a relay network or mesh network that includes at least one of a second relay node, a base station, an access point, or an access gateway.

The configuring 780 the relay node not to use to the automatic repeat request protocol for communicating with the relay network or the mesh network can be performed 781 selectively when a predetermined condition is met. The method can include deciding 782 that the predetermined condition is met when a user equipment desired delay is below a predetermined threshold. The method can further include configuring 784 the predetermined threshold to be about 80 ms. As noted above, the predetermined threshold can depend on the number of hops the packet has to travel and the position (with respect, for example, to hops away from AG in DL) of the RN. Thus, 80 ms can merely be the end-to-end delay that should be achieved to satisfy typical user requirements.

The method can also include deciding 786 that the predetermined condition is met when an expected number of hops between an access gateway, access point, or base station is greater than or equal to a predetermined number of hops. The predetermined number of hops can be an integer value equal to or less than five.

The method can further include deciding 787 that the predetermined condition is met when a packet indicates that an existing delay is greater than or equal to a predetermined threshold.

The method can likewise include identifying 788 a quality of service of user equipment communication and determining 789 that the predetermined condition is met when the quality of service corresponds to at least one of voice over internet protocol traffic or streaming traffic.

When configuring the relay node not to use the automatic repeat request protocol for communicating with the relay network or the mesh network, the method can also include configuring 790 the relay node for employing intelligent routing to avoid weak links in the relay network or mesh network, for changing traffic scheduling parameters, or for using a more robust link adaptation.

Figure 8:
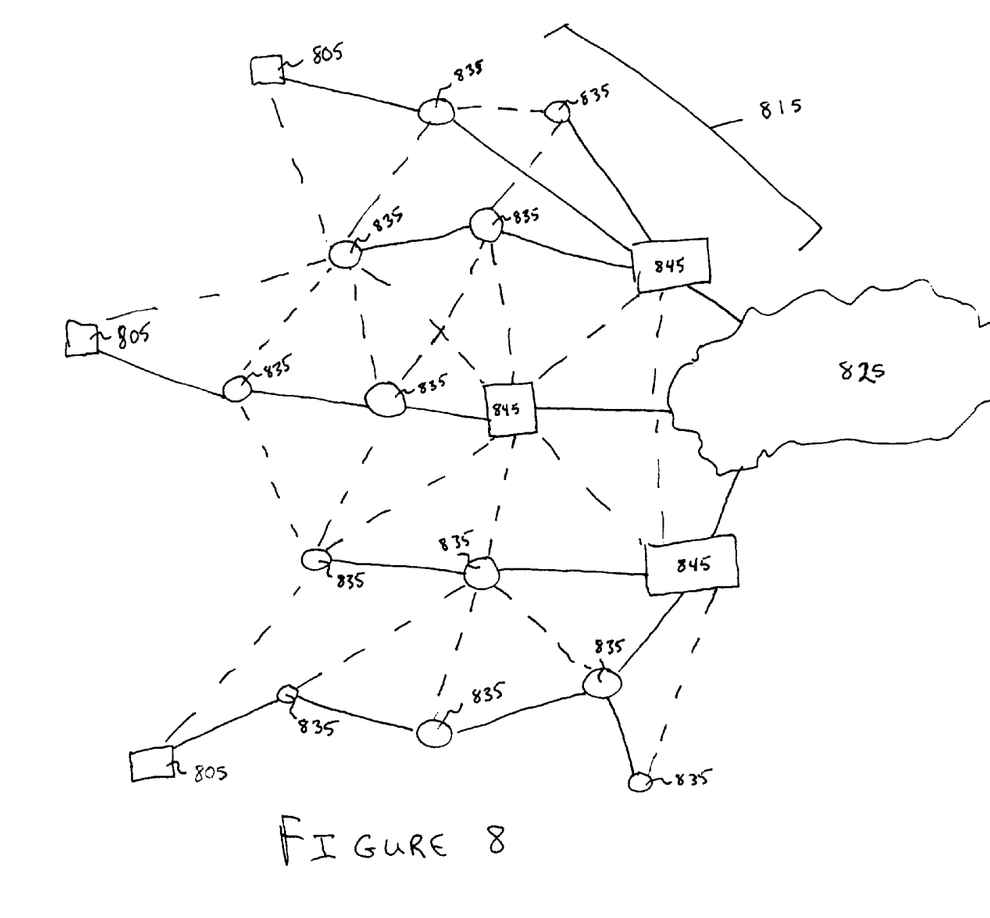
FIG. 8 illustrates an example of a system according to an embodiment of the present invention.

FIG. 8 illustrates an example of a system according to an embodiment of the present invention. The system can include one or more user equipment 805. The user equipment 805 may be cellular phones, personal digital assistants, or any communicative portable electronic device. In some instances the user equipment 805 can be in a fixed location.

The system can also include a network 815, which may be a relay network or a mesh network, configured to provide access to an internet protocol backbone 825. The network 815 may include one or more relay nodes 835 configured to communicate with the user equipment 815, configured to communicate with the network 815, and configured to use an automatic repeat request protocol for communication with the user equipment 805 and not to use the automatic repeat request protocol for communication with the network 815. The network 815 can also include one or more access gateway nodes 845.

The network 815 is shown with a hierarchical connection indicated in solid lines and an alternative mesh connection indicated in dashed lines.

One having ordinary skill in the art will readily understand that the invention as discussed above may be practiced with steps in a different order, and/or with hardware elements in configurations that are different than those that are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What we claim is:

1. An apparatus, comprising:
   at least one memory including computer program code; and
   at least one processor,
   wherein the at least one memory and the computer program code are configured to, with the at least one processor, cause the apparatus at least to
   communicate directly or indirectly with a user equipment;
   communicate with a relay node or a mesh node; and
   allow an automatic repeat request protocol for communication with the user equipment and, during a same time period as the automatic repeat request protocol is allowed for communication with the user equipment, to disable or limit the automatic repeat request protocol for communication with the relay node or the mesh node, wherein the at least one memory and the computer program code are also configured to, with the at least one processor, cause the apparatus at least to disable or limit the automatic repeat request protocol for communication with the relay node or the mesh node when communication with the user equipment meets a predetermined condition, and wherein the predetermined condition is at least one of that a user equipment desired delay is less than a predetermined threshold; that a number of expected hops between an access gateway, access point, or base station and the user equipment is greater than or equal to a predetermined number of hops; that a timestamp on a packet indicates an existing delay that is equal to or greater than a predetermined threshold; or that a quality of service corresponds to at least one of voice over internet protocol traffic or streaming traffic.

2. The apparatus of claim 1, wherein the at least one memory and the computer program code are also configured to, with the at least one processor, cause the apparatus at least to communicate with the user equipment over a radio link.

3. The apparatus of claim 1, wherein the at least one memory and the computer program code are also configured to, with the at least one processor, cause the apparatus at least to communicate with a mobile user equipment.

4. The apparatus of claim 1, wherein the at least one memory and the computer program code are also configured to, with the at least one processor, cause the apparatus at least to communicate with a relay network that comprises at least one of a second relay node, a base station, an access point, or an access gateway.

5. The apparatus of claim 1, wherein the at least one memory and the computer program code are also configured to, with the at least one processor, cause the apparatus at least to communicate with a mesh network that comprises at least one of a second relay node, a base station, an access point, or an access gateway.

6. The apparatus of claim 1, wherein the at least one memory and the computer program code are also configured to, with the at least one processor, cause the apparatus at least to disable or limit the automatic repeat request protocol for communication with the relay node or the mesh node selectively.

7. The apparatus of claim 6, wherein the at least one memory and the computer program code are also configured to, with the at least one processor, cause the apparatus at least to identify a quality of service for communication of the user equipment.

8. The apparatus of claim 7, wherein the quality of service corresponds to at least one of voice over internet protocol traffic, video over internet protocol traffic, interactive collaboration traffic, interactive gaming traffic, or streaming traffic.

9. The apparatus of claim 1, wherein the predetermined threshold is about 80 ms.

10. The apparatus of claim 1, wherein the predetermined number of hops is an integer less than or equal to five.

11. The apparatus of claim 1, wherein the at least one memory and the computer program code are also configured to, with the at least one processor, cause the apparatus at least to, when disabling the automatic repeat request protocol, perform at least one of
to employ intelligent routing to avoid weak links in the relay network or mesh network,
to change traffic scheduling parameters, or
to use a more robust link adaptation.

12. An apparatus, comprising:
access means for communicating directly or indirectly with a user equipment;
relay means for communicating with a relay node or a mesh node; and
processor means for allowing an automatic repeat request protocol for the access unit and, during a same time period as the automatic repeat request protocol is allowed for communication with the user equipment, disabling or limiting the automatic repeat request protocol for the relay node or the mesh node,
wherein the processor means is also configured to disable or limit the automatic repeat request protocol for communication with the relay node or the mesh node when communication with the user equipment meets a predetermined condition, and
wherein the predetermined condition is at least one of that a user equipment desired delay is less than a predetermined threshold; that a number of expected hops between an access gateway, access point, or base station and the user equipment is greater than or equal to a predetermined number of hops; that a timestamp on a packet indicates an existing delay that is equal to or greater than a predetermined threshold; or that a quality of service corresponds to at least one of voice over internet protocol traffic or streaming traffic.

13. A method, comprising:
providing a relay node in direct or indirect communication with a user equipment and a relay network or a mesh network, wherein the relay network or mesh network provides access to a internet protocol backbone;
configuring the relay node to use an automatic repeat request protocol for communication with the user equipment;
configuring the relay node not to use or to limit use of the automatic repeat request protocol for communicating with the relay network or the mesh network, during a same time period as the automatic repeat request protocol is allowed for communication with the user equipment; and
configuring the relay node to disable or limit the automatic repeat request protocol for communication with the relay network or the mesh network when communication with the user equipment meets a predetermined condition, and
wherein the predetermined condition is at least one of that a user equipment desired delay is less than a predetermined threshold; that a number of expected hops between an access gateway, access point, or base station and the user equipment is greater than or equal to a predetermined number of hops; that a timestamp on a packet indicates an existing delay that is equal to or greater than a predetermined threshold; or that a quality of service corresponds to at least one of voice over internet protocol traffic or streaming traffic.

14. The method of claim 13, further comprising:
configuring the relay node to communicate with the user equipment over a radio link.

15. The method of claim 13, further comprising:
configuring the relay node to communicate with a mobile user equipment.

16. The method of claim 13, further comprising:
configuring the relay node to communicate with at least one of a second relay node, a base station, an access point, or an access gateway.

17. The method of claim 13, further comprising:
configuring the relay node to communicate with a mesh network that comprises at least one of a second relay node, a base station, an access point, or an access gateway.

18. The method of claim 13, further comprising:
configuring the predetermined threshold to be about 80 ms.

19. The method of claim 13, further comprising:
configuring the predetermined number of hops to be an integer value equal to or less than five.

20. The method of claim 13, further comprising:
identifying a quality of service of user equipment communication; and
determining that the predetermined condition is met when the quality of service corresponds to at least one of voice over internet protocol traffic, video over internet protocol traffic, interactive collaboration traffic, interactive gaming traffic, or streaming traffic.

21. The method of claim 13, further comprising:
when configuring the relay node not to use the automatic repeat request protocol for communicating with the relay network or the mesh network, configuring the relay node to perform at least one of
employing intelligent routing to avoid weak links in the relay network or mesh network,
changing traffic scheduling parameters, or
using a more robust link adaptation.

22. A system, comprising:
a user equipment;
a relay network or a mesh network configured to provide access to an internet protocol backbone; and
a relay node configured to communicate directly or indirectly with the user equipment, configured to communicate with the relay network or mesh network, and configured to use an automatic repeat request protocol for communication with the user equipment and, during a same time period as the automatic repeat request protocol is allowed for communication with the user equipment, not to use or to limit use of the automatic repeat request protocol for communication with the relay network or mesh network,
wherein the relay node is configured to disable or limit the automatic repeat request protocol for communication with the relay network or the mesh network when communication with the user equipment meets a predetermined condition, and
wherein the predetermined condition is at least one of that a user equipment desired delay is less than a predetermined threshold; that a number of expected hops between an access gateway, access point, or base station and the user equipment is greater than or equal to a predetermined number of hops; that a timestamp on a packet indicates an existing delay that is equal to or greater than a predetermined threshold; or that a quality of service corresponds to at least one of voice over internet protocol traffic or streaming traffic.

23. A computer program embodied on a non-transitory computer readable medium, encoding instructions for performing a method, comprising:
initiating a relay node in direct or indirect communication with a user equipment and a relay network or a mesh network, wherein the relay network or mesh network provides access to a internet protocol backbone;
configuring the relay node to use an automatic repeat request protocol for communication with the user equipment; and
configuring the relay node not to use or to limit use of the automatic repeat request protocol for communicating with the relay network or the mesh network, during a same time period as the automatic repeat request protocol is allowed for communication with the user equipment,
configuring the relay node to disable or limit the automatic repeat request protocol for communication with the relay network or the mesh network when communication with the user equipment meets a predetermined condition, and
wherein the predetermined condition is at least one of that a user equipment desired delay is less than a predetermined threshold; that a number of expected hops between an access gateway, access point, or base station and the user equipment is greater than or equal to a predetermined number of hops; that a timestamp on a packet indicates an existing delay that is equal to or greater than a predetermined threshold; or that a quality of service corresponds to at least one of voice over internet protocol traffic or streaming traffic.

24. The apparatus of claim 1, wherein the at least one memory and the computer program code are also configured to, with the at least one processor, cause the apparatus at least to limit the automatic repeat request protocol for communication with the relay node or the mesh node by limiting the number of retransmissions to a number that is less than a default number of retransmissions.

25. The apparatus of claim 1, wherein the predetermined condition is determined to be met by considering an overall delay requirement and subtracting an existing delay to provide a remaining delay, wherein the predetermined condition is determined to be met when the remaining delay is not predicted to be met with retransmissions set at a default level.

26. The method of claim 13, wherein configuring the relay node to limit the automatic repeat request protocol for the relay node comprises limiting the number of retransmissions to a number that is less than a default number of retransmissions.

27. The method of claim 13, further comprising:
considering an overall delay requirement and subtracting an existing delay to provide a remaining delay; and
determining the predetermined condition to be met when the remaining delay is not predicted to be met with retransmissions set at a default level.

* * * * *